Dec. 7, 1926.

T. DE W. PATTON

SUPPORT

Filed Jan. 4, 1926

T. DeWitt Patton, INVENTOR.

BY

Geo. P. Kimmel, ATTORNEY.

Dec. 7, 1926.  
T. DE W. PATTON  
1,610,108  
SUPPORT  
Filed Jan. 4, 1926  
3 Sheets-Sheet 2

T. DeWitt Patton, INVENTOR.

BY

Geo. F. Kimmel, ATTORNEY.

Dec. 7, 1926.

T. DE W. PATTON

SUPPORT

Filed Jan. 4, 1926

T. DeWitt Patton, INVENTOR.

BY

Geo. F. Kimmel, ATTORNEY.

Patented Dec. 7, 1926.

1,610,108

UNITED STATES PATENT OFFICE.

THOMAS DE WITT PATTON, OF BATTLE CREEK, MICHIGAN.

SUPPORT.

Application filed January 4, 1926. Serial No. 79,179.

This invention relates to a portable illuminating support designed primarily for use in connection with an aquarium or other container having its contents illuminated, and has for its object to provide, in a manner as hereinafter set forth, a support to be placed between a supporting means therefor and the container to be supported thereby and provided with means for the reception of an illuminating element and further provided with means not only to constitute a reflector for directing the light rays to illuminate the contents of the aquarium or other container mounted on the support, but to further form the top of a cold air space or chamber.

A further object of the invention is to provide, in a manner as hereinafter set forth, a support for the purpose referred to having means for the outlet of heated air, due to the action of the illuminating element, and further having means forming an inlet for cooling air.

A further object of the invention is to provide, in a manner as hereinafter set forth, a support for the purpose referred to, formed with a seat for the article to be supported, and further provided with a reflecting means spaced from the seat for directing light rays in a manner to illuminate the contents of the container or aquarium mounted on the seat.

A further object of the invention is to provide, in a manner as hereinafter set forth, a support for the purpose referred to, including a seat for the receptacle or container with which the support is associated and further with the seat provided with means to form outlets for heated air created on the activity of an illuminating element to illuminate the contents of the aquarium receptacle or container.

Further objects of the invention are to provide, in a manner as hereinafter set forth, a support for the purpose referred to, preferably constructed of a continuous body portion formed from a single sheet of suitable material, strong, durable, compact, thoroughly efficient in its use, ventilated, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
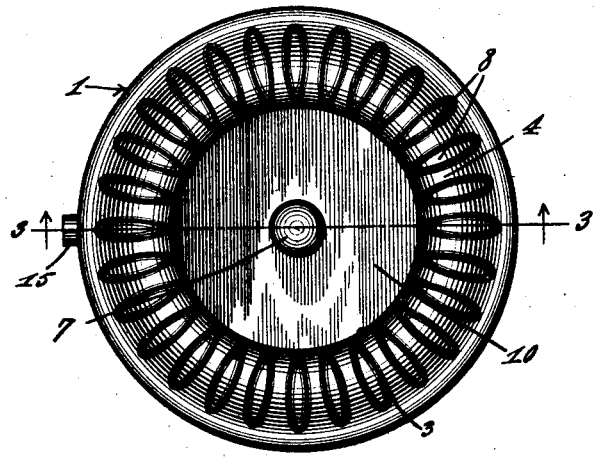
Figure 1 is a top plan view of a support, in accordance with this invention.
Figure 2:
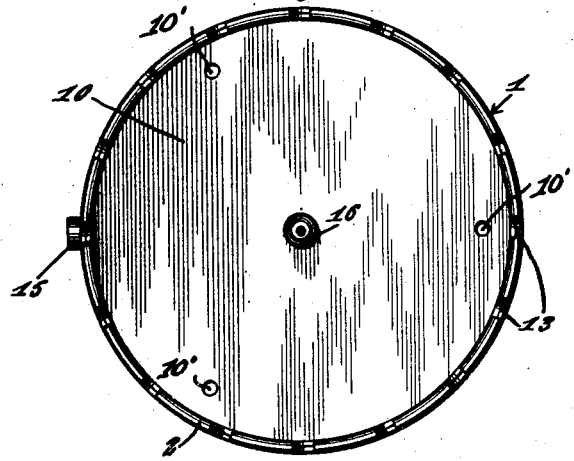
Figure 2 is an inverted plan thereof.
Figure 3:
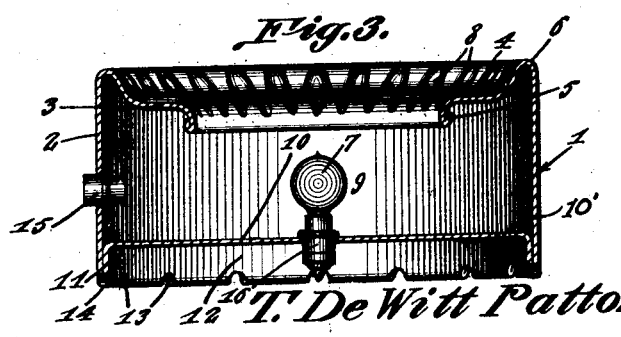
Figure 3 is a section on line 3—3, Figure 1.

Referring to Figures 1, 2 and 3 of the drawings, the support which is portable and referred to generally by the reference character 1, is constructed from sheet metal or other suitable material by pressing, stamping, etc., and the support 1 can be of any suitable contour, preferably annular, and as shown the said support 1 comprises a cylindrical body portion 2, having extending therein from the top thereof a depending, continuous flange forming a shelf 3, which is of compound curvature in cross section to provide a seat 4 for the aquarium, receptacle or container, which is to be removably mounted upon the support 1. The inner edge of the shelf 3 is bent upon itself, as at 5, for the purpose of stiffening said edge. The shelf 3 is connected with the body portion 2 by a curved bend 6. The inner edge of the shelf 3 is positioned at a point between the transverse median of the body portion 2 and the top of the latter. The shelf 3 is provided with any suitable means for the outlet of heated air created by the activity of an illuminating element or lamp 7, which is positioned below the inner edge 5 of said shelf 3 and by way of example said means is illustrated by spaced depressed portions 8 formed throughout the upper face of the shelf 3. The depressed portions 8 further reinforce the shelf 3.

Arranged within the support 1 is a chamber 9 for a lamp 7 and which is formed by the body portion 2, shelf 3 and a reflector 10, which is upwardly disposed with respect to the bottom of the body portion 2. The reflector 10 terminates in a depending continuous flange 11 which abuts against the inner face of the body portion 2. The reflector 10, in connection with the flange 11, provides a chamber 12 for the reception of cool air and which is supplied thereto through the medium of one or more notches 13 formed in the bend 14 between the flange 11 and the body portion 2.

The body portion 2 carries a lamp socket 15 which extends into the chamber 9 and the reflector 10 carries centrally thereof a lamp socket 16 which extends into the chamber 9. As illustrated the lamp 7 is connected to the socket 16.

The reflector 10 corresponds to the shape of the body portion 2 and when the aquarium, receptacle or support is mounted on the seat 6, the rays from the lamp 7 are directed up through the opening formed by the shelf 3 for the purpose of illuminating the contents of the aquarium, receptacle or container. The cool air supplied to the chamber 12 will cool the reflector 10 and the hot air created in the chamber 9 during the activity of the lamp 7 will be discharged from the chamber 9 through the medium of the depressions 8. The reflector 10 is provided without openings 10′ forming outlets for the chamber 12.

Figure 4:
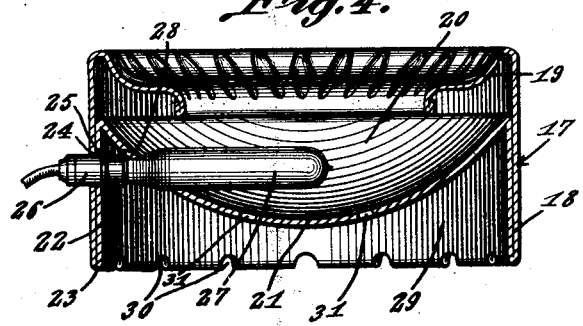
Figures 4, 5 and 6 are sectional elevations of modified forms of supports in accordance with this invention.

Referring to Figure 4 of the drawings, the support is referred to generally by the reference character 17 and is constructed from sheet metal or other suitable material, in any desirable manner. The support 17 comprises a body portion 18 of any suitable contour, and as shown cylindrical and which has extending therein, from the top thereof, a shelf 19 of the same construction and for the same purpose as the shelf 3 heretofore referred to. The support 17 is provided with a lamp chamber 20 formed by the body portion 18 in connection with the shelf 19 and a concave reflector 21 having its top positioned at the inner edge of the annulus 19. Arranged against the inner face of the body portion 18 is a vertically disposed collar 22, having its top terminating in the reflector 20 and forming a support for the latter. The top of the collar 22 is positioned at a point between the transverse center of the body portion 18 and the top thereof. The body portion 18 and collar 22 are provided with aligning openings 24, 25 respectively for the passage of a lamp socket 26. The lamp carried by the socket 26 is disposed diametrically with respect to the support and is indicated at 27 and further extends through an opening 28 formed in one side of the reflector 21.

The reflector 21, in connection with the collar 22 provides a cool air chamber 29 which surrounds the reflector 21, and cool air is supplied to the chamber 29 by one or more notches 30 formed in the bend 23. The reflector 21 is formed with one or more openings 31 for establishing communication between the chambers 20 and 29. The support 17 functions in the same manner as the support 1.

Figure 5:
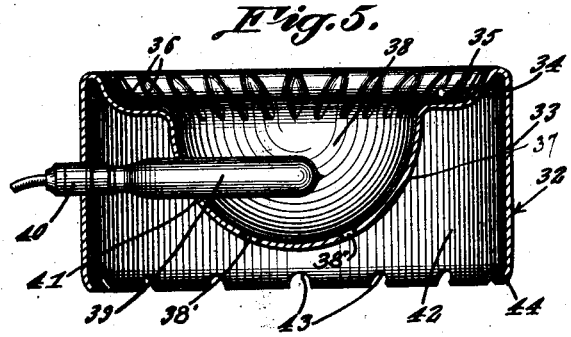

Referring to Figure 5 of the drawings, the support is formed from a single sheet of metallic or other suitable material in any desirable manner, is of any suitable contour, as shown of annular contour, and is referred to generally by the reference character 32.

The support 32 consists of a body portion 33 having extending inwardly from the top thereof, as well as depending therein, a substantial distance, a shelf 34 of compound curvature in cross section to provide a seat 35 for the aquarium, receptacle or container with which the support is to be associated. The shelf 34 is provided with any suitable means to provide outlets for a lamp chamber, and as illustrated the upper face of the annulus 34 is provided throughout with spaced depressions 36. Formed integral with the inner side of the annulus 34, as well as depending therefrom is a reflector 37, which terminates a substantial distance above the bottom of the body portion 33 and is parabolical in contour. The reflector 37 provides a lamp chamber 38 for the lamp 39, which is disposed diametrically with respect to the body portion 33 and is carried by a socket 40 secured to said body portion. The reflector 37 is formed with an opening 41 for the passage of the lamp 39 into the chamber 38. The body portion 33, in connection with the shelf 34 and reflector 37, provides an air chamber 42 which surrounds the reflector 37. Cool air is admitted to the chamber 42 by one or more notches 43 formed in the bottom of the body portion 33. Cool air is admitted to the chamber 38 by openings 38′ formed in the reflector 37. The bottom of the body portion 33, which is indicated at 44, is inturned.

Figure 6:
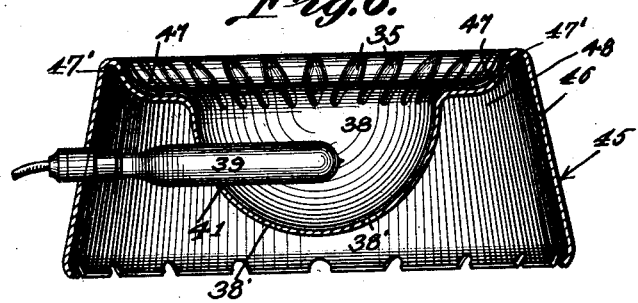

In the form shown in Figure 6, the support is indicated generally by the reference character 45 and is of the same construction as that referred to in connection with Figure 5, with the exception that the body portion 46 of the support 45 is of tapered contour and the shelf 47 is formed with openings 47′ forming outlets for the chamber 48. Otherwise than that as stated, the form shown in Figure 6 is the same as that shown in Figure 5.

Figure 7:
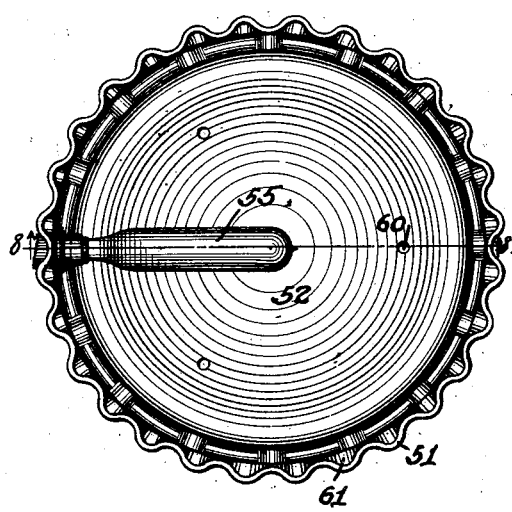
Figure 7 is a top plan view and Figure 8 a section on line 8—8, Figure 7, of another modified form of support.
Figure 8:
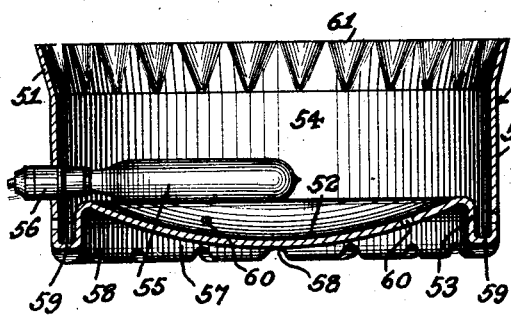

In the form shown in Figures 7 and 8, the support is referred to generally by the reference character 49, is of suitable contour, and as shown cylindrical. The support 49 comprises a body portion 50 having its upper part 51 of flaring contour to form a shelf which provides a seat for the aquarium, receptacle or container which is to be supported and to have its contents illuminated. Arranged within the lower part of the body portion 50 is a concave reflector 52 formed with a depending angle-shaped flange 53 which merges into the lower end of the body portion 50. The reflector, flange and body portion form a chamber 54 for lamp 55, which is radially disposed and connected to a socket 56 carried by the body portion 50. The reflector and vertical portion of the flange provides a cool air receiving chamber 57 formed with inlet means 58 provided by upsetting the horizontal portion of the flange and lower end of the body portion, as at 59. The reflector 52 is formed with openings 60 to provide outlets for the chamber 57 and inlets for the chamber 54. Outlets for the chamber 54 are provided by forming the shelf with transversely extending tapered corrugations 61.

Figure 9:
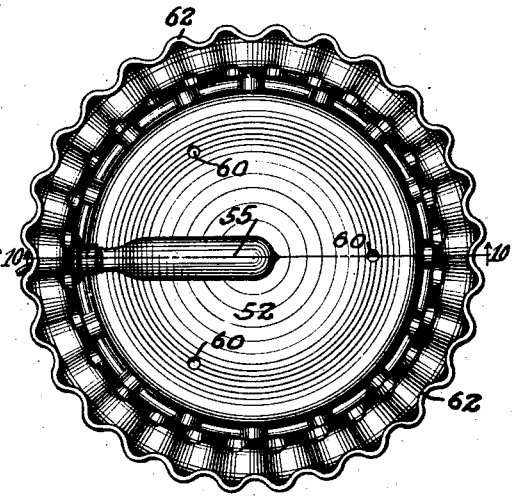
Figure 9 is a top plan view and Figure 10 a section on line 10—10, Figure 9 of still another modified form.
Figure 10:
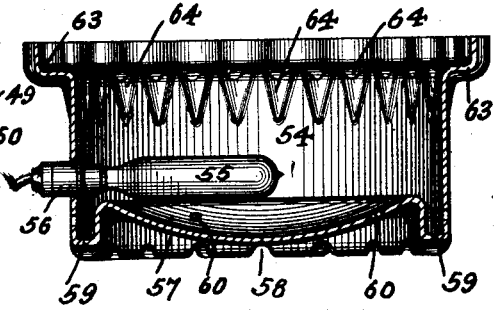

The form shown in Figures 9 and 10, is the same as that referred to in connection with Figures 7 and 8 with the exception that the upper part 62 of the body portion 50 is not of flaring construction but is of angle shape section, as indicated at 63 to form a shelf for supporting the aquarium, receptacle or container and for surrounding the same. The vertical portion of the upper part 62 of the body portion 50 is offset with respect to the remaining part of the body portion. The outlets for the lamp chamber 54 are formed by providing the part 62 with tapered corrugations 64 which start at a point below the part 62 and extend entirely therethrough. Otherwise than that as stated the form shown in Figures 9 and 10 is the same as that referred to in connection with the form illustrated in Figures 7 and 8.

The shelf, in each form referred to, not only provides a seat for the aquarium, receptacle or container, but further constitutes a guarding rim for protecting the bottom thereof, as well as for spacing the aquarium, receptacle or container a substantial distance from the illuminating means. Further, as the heated air can be discharged from the lamp chamber it prevents the water in the aquarium from becoming too hot. The support is set up of a material impervious to light.

It is thought the many advantages of a support for the purpose referred to, can be readily understood, and although the preferred embodiments of the invention are as illustrated and described, yet it is to be understood that changes in the details of construction can be had which will fall within the scope of the invention as claimed.

What I claim is:—

1. A support for the purpose set forth comprising a body portion, a shelf depending therein at the upper portion thereof and providing a seat for the article to be supported, a curved reflector arranged within the body portion and depending below said shelf, said body portion, shelf and reflector formed from a single sheet of material, and means to provide a cool air chamber associated with the reflector and including air inlet means therefor.

2. A support for the purpose set forth comprising a hollow body portion provided at its top with an offset portion to form a seat for the article to be supported, a reflector within said body portion for association with an illuminating means positioned below the seat, a cool air chamber below and for association with said reflector, said body portion provided at its bottom edge with an inlet means for said chamber, and said seat provided with means for the passage of heated air between it and the article supported thereby.

3. A support for the purpose set forth comprising a body portion formed with a lamp chamber and a cool air chamber below the lamp chamber, means for supporting illuminating means within said chamber, an inwardly arranged combined article supporting seat and guard at the top of said body portion and forming the top wall of the lamp chamber, and a reflector within said body portion and providing the bottom of the lamp chamber and the top of the cool air chamber, said body portion having its bottom edge formed with air inlet means for said cool air chamber, and said seat provided with means for the exhaust of the heated air from the lamp chamber and between the seat and the article supported thereby.

4. A support for the purpose set forth comprising a body portion provided at its top with means for receiving the article to be supported, a lamp chamber within said body portion means for attaching one or more lamps within said chamber, and the said means at the top of said body portion forming an inwardly extending seat shaped to permit of the escape of heated air from beneath the article mounted thereon.

5. A support for the purpose set forth comprising a one-piece body portion formed with a lamp chamber, a cool air receiving chamber positioned below the lamp chamber, and a corrugated seat at the top of the body portion for the article to be supported, the upper face of the bottom of the lamp chamber providing a reflector and said bottom being apertured for establishing communication between the said chambers.

In testimony whereof, I affix my signature hereto.

THOMAS DE WITT PATTON.